US012794632B2

(12) United States Patent
Li et al.

(10) Patent No.: US 12,794,632 B2
(45) Date of Patent: Nov. 10, 2026

(54) PHASE TRACKING REFERENCE SIGNAL PATTERN CONFIGURATION AND SIGNALING IN WIRELESS COMMUNICATION SYSTEM

(71) Applicant: ZTE Corporation, Shenzhen (CN)

(72) Inventors: Ziyang Li, Shenzhen (CN); Li Tian, Shenzhen (CN); Juan Liu, Shenzhen (CN); Li Zhang, Shenzhen (CN); Wei Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 301 days.

(21) Appl. No.: 18/520,271

(22) Filed: Nov. 27, 2023

(65) Prior Publication Data

US 2024/0097854 A1 Mar. 21, 2024

Related U.S. Application Data

(63) Continuation of application No. PCT/CN2021/121570, filed on Sep. 29, 2021.

(51) Int. Cl.

| | |
|---|---|
| ***H04L 5/00*** | (2006.01) |
| ***H04W 72/0453*** | (2023.01) |
| ***H04W 72/232*** | (2023.01) |
| ***H04W 76/20*** | (2018.01) |

(52) U.S. Cl.

CPC ....... *H04L 5/0051* (2013.01); *H04W 72/0453* (2013.01); *H04W 72/232* (2023.01); *H04W 76/20* (2018.02)

(58) Field of Classification Search

CPC ................. H04L 5/0005; H04L 5/0048; H04L 5/0051; H04L 25/0226; H04L 27/18; H04L 27/26; H04W 72/0453; H04W 72/232

USPC .................................................. 370/252, 329

See application file for complete search history.

(56) References Cited

U.S. PATENT DOCUMENTS

| | | | | |
|---|---|---|---|---|
| 2018/0323933 | A1 | 11/2018 | Nam et al. | |
| 2020/0092814 | A1 | 3/2020 | Zhou et al. | |
| 2020/0252181 | A1 * | 8/2020 | Gao | H04L 5/0048 |
| 2021/0099265 | A1 | 4/2021 | Shin et al. | |
| 2021/0266128 | A1 | 8/2021 | Zhang et al. | |

(Continued)

FOREIGN PATENT DOCUMENTS

| | | | |
|---|---|---|---|
| CN | 108111272 | A | 6/2018 |
| EP | 4 089 950 | A1 | 11/2022 |
| WO | WO 2021/128151 | A1 | 7/2021 |

(Continued)

OTHER PUBLICATIONS

WO2021189216_Machine Translation (Year: 2021).*

(Continued)

*Primary Examiner* — Harun Chowdhury

(74) *Attorney, Agent, or Firm* — Crowell & Moring LLP

(57) ABSTRACT

This disclosure relates to phase tracking reference signal (PTRS) resource pattern configuration and signaling. Multiple PTRS resource pattern types may be predefined. Various manners in which a PTRS resource pattern configuration of a particular PTRS resource pattern type is communicated and signaled are disclosed. The disclosed PTRS resource pattern configuration and signaling may facilitate more efficient and flexible PTRS implementations for phase noise compensation at high frequency radio bands.

15 Claims, 8 Drawing Sheets

(56) References Cited

U.S. PATENT DOCUMENTS

2022/0021497 A1* 1/2022 Bai ........................ H04L 5/0048

FOREIGN PATENT DOCUMENTS

| | | | | | |
|---|---|---|---|---|---|
| WO | WO 2021/145751 | A1 | | 7/2021 | |
| WO | WO 2021/160925 | A1 | | 8/2021 | |
| WO | WO-2021189216 | A1 | * | 9/2021 | ............. H04L 27/26 |

OTHER PUBLICATIONS

Extended European Search Report dated Jun. 24, 2024 and Supplementary European Search Report dated Jun. 4, 2024, issued in corresponding European Application No. EP 21958711.0 (9 pages).

LG Electronics; "Remaining issues on rate matching resources"; 3GPP TSG RAN WG1 Meeting 91, Reno, USA; R1-17199371; Nov. 27-Dec. 1, 2017; 11 pages.

Samsung; "Discussion on transmission parameter sets"; 3GPP TSG RAN WG1 NR Ad-Hoc#2, Qingdao, P.R.; R1-1710650; China Jun. 27-30, 2017; 3 pages.

International Search Report mailed May 25, 2022 for International Application No. PCT/CN2021/121570.

Written Opinion mailed May 25, 2022 for International Application No. PCT/CN2021/121570.

Mitsubishi Electric: PT-RS Enhancements for NR from 52.6GHz to 71GHz, 3GPP TSG RAN WG1 #106-e R1-2106569, 3GPP, Aug. 2, 2021.

Futurewei: Considerations on PDSCH/PUSCH Enhancements, 3GPP TSG RAN WG1 #104b-e R1-2102776, 3GPP, Apr. 7, 2021.

Japanese Patent Office Action in JP Application No. 2023-573378, dated Nov. 29, 2024, with English Translation (8 pages).

* cited by examiner

PHASE TRACKING REFERENCE SIGNAL PATTERN CONFIGURATION AND SIGNALING IN WIRELESS COMMUNICATION SYSTEM

CROSS REFERENCE

This application is a continuation of and claims priority to International Patent Application No. PCT/CN2021/121570, filed on Sep. 29, 2021, which is herein incorporated by reference in its entirety.

TECHNICAL FIELD

This disclosure is directed generally to wireless access communication networks and particularly to phase tracking reference signal resource pattern configuration and signaling.

BACKGROUND

Wireless access communication networks are expanding to over-the-air interface supporting higher frequency bands. Traditional methods for mitigating phase noise may not be adequate in these high frequency bands. Phase tracking reference signal (PTRS) may be employed and distributed over a wireless communication resource pattern in these high frequency band and may be measured. Such measurements maybe utilized for more effective compensation of phase noise. Multiple co-existing PTRS resource patterns may be designed for selection based on specific channels. Design of systems that utilize these PTRS resource patterns must include a mechanism for the configuration of these co-existing multiple PTRS patterns and signaling of a particular configured PTRS resource pattern among the multiple co-existing PTRS resource patterns.

SUMMARY

This disclosure relates to methods, systems, and devices for PTRS resource pattern configuration and signaling. Multiple PTRS resource pattern types may be predefined. Various manners in which a PTRS resource pattern configuration of a particular PTRS resource pattern type is communicated and signaled are disclosed. The disclosed PTRS resource pattern configuration and signaling may facilitate more efficient and more flexible PTRS implementations for phase noise compensation at high frequency radio bands.

In one embodiment, a method performed by a wireless terminal device is disclosed. The method comprises receiving a control message, the control message comprising a PTRS resource configuration parameters; obtaining a signaling information, the signaling information indicating a particular PTRS resource pattern type among a plurality of predefined PTRS resource pattern types; decoding the control message to extract one or more of the set of PTRS resource configuration parameters based on the particular PTRS resource pattern type; and receiving or transmitting PTRS signals over radio resources specified by the one or more of the set of PTRS resource configuration parameters.

In another embodiment, a method performed by a wireless access network node is disclosed. The method comprises selecting a particular PTRS resource pattern type among a plurality of predefined PTRS resource pattern types; constructing a control message, the control message comprising a set of phase tracking reference signal (PTRS) resource configuration parameters; determining parameter values for one or more of the set of PTRS resource configuration parameters to specify a PTRS resource pattern having the particular PTRS resource pattern type; transmitting the control message to a wireless terminal device; and providing a signaling information to the wireless terminal device to indicate the particular PTRS resource pattern type.

In another embodiment, a wireless device comprising a processor and a memory is disclosed. The processor may be configured to read computer code from the memory to implement any of the methods above.

In yet another embodiment, a computer program product comprising a non-transitory computer-readable program medium with computer code stored thereupon is disclosed. The computer code, when executed by a processor, may cause the processor to implement any one of the methods above.

The above embodiments and other aspects and alternatives of their implementations are described in greater detail in the drawings, the descriptions, and the claims below.

DETAILED DESCRIPTION

The technology and examples of implementations and/or embodiments described in this disclosure can be used to facilitate over-the-air radio resource allocation, configuration, and signaling in wireless access networks. The term "exemplary" is used to mean "an example of" and unless otherwise stated, does not imply an ideal or preferred example, implementation, or embodiment. Section headers are used in the present disclosure to facilitate understanding of the disclosed implementations and are not intended to limit the disclosed technology in the sections only to the corresponding section. The disclosed implementations may be further embodied in a variety of different forms and, therefore, the scope of this disclosure or claimed subject matter is intended to be construed as not being limited to any of the embodiments set forth below. The various implementations may be embodied as methods, devices, components, systems, or non-transitory computer readable media.

Accordingly, embodiments of this disclosure may, for example, take the form of hardware, software, firmware or any combination thereof.

This disclosure is directed to methods, systems, and devices related to wireless access networks, and more specifically, to phase tracking reference signal (PTRS) resource pattern configuration and signaling. While this disclosure provides example implementations in some particular generations of cellular network system, the underlying principles are applicable to other generations of cellular network systems and other general non-cellular wireless network systems.

Wireless Network Overview

Figure 1:
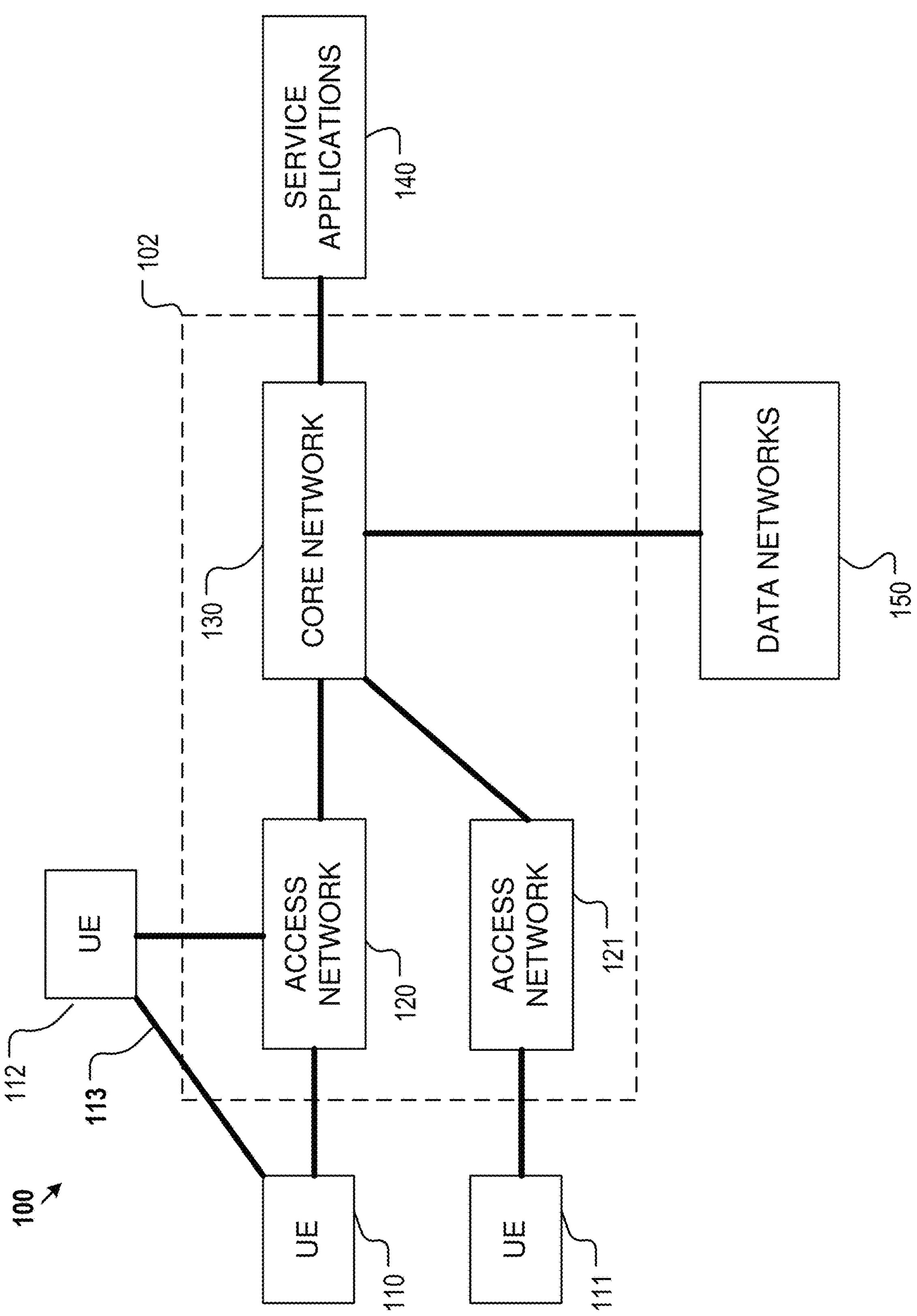
FIG. 1 illustrates an example wireless communication network comprising a wireless access network, a core network, and data networks.

An example wireless communication network, shown as 100 in FIG. 1, may include user equipment (UE) 110, 111, and 112, a carrier network 102, various service applications 140, and other data networks 150. The carrier network 102, for example, may include access networks 120 and 121, and a core network 130. The carrier network 110 may be configured to transmit voice, data, and other information (collectively referred to as data traffic) among UEs 110, 111, and 112, between the UEs and the service applications 140, or between the UEs and the other data networks 150. The Access networks 120 and 121 may be configured as various wireless access network nodes (WANNs, alternatively referred to as base stations) to interact with the UEs on one side of a communication session and the core network 130 on the other. The core network 130 may include various network nodes configured to control communication sessions and perform network access management and traffic routing. The service applications 140 may be hosted by various application servers deployed outside of but connected to the core network 130. Likewise, the other data networks 150 may also be connected to the core network 130.

In the wireless communication network of 100 of FIG. 1, the UEs may communicate with one another via the wireless access network. For example, UE 110 and 112 may be connected to and communicate via the same access network 120. The UEs may communicate with one another via both the access networks and the core network. For example, UE 110 may be connected to the access network 120 whereas UE 111 may be connected to the access network 121, and as such, the UE 110 and UE 111 may communicate to one another via the access network 120 and 121, and the core network 130. The UEs may further communicate with the service applications 140 and the data networks 150 via the core network 130. Further, the UEs may communicate to one another directly via side link communications, as shown by 113.

Figure 2:
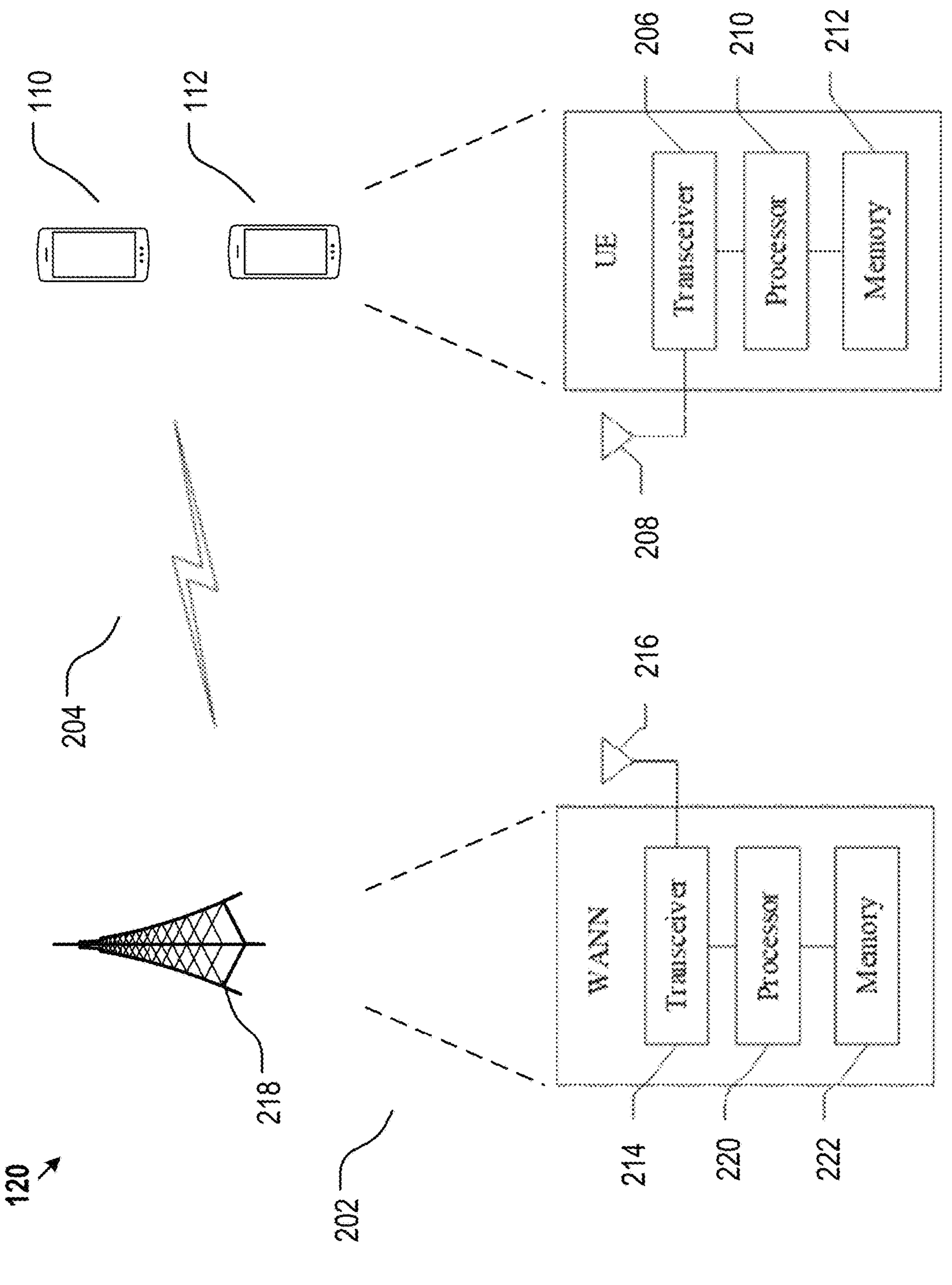
FIG. 2 illustrates an example wireless access network including a plurality of mobile stations and a wireless access network node in communication without another via an over-the-air communication interface.

FIG. 2 further shows an example system diagram of the wireless access network 120 including a WANN 202 serving UEs 110 and 112 via the over-the-air interface 204. Each of the UEs 110 and 112 may be a mobile or fixed terminal device installed with mobile access units such as SIM/USIM modules for accessing the wireless communication network 100. The UEs 110 and 112 may be implemented as a terminal device including but not limited to a mobile phone, a smartphone, a tablet, a laptop computer, a vehicle on-board communication equipment, a roadside communication equipment, a sensor device, a smart appliance (such as a television, a refrigerator, and an oven), or other devices that are capable of communicating wirelessly over a network. As shown in FIG. 2, each of the UEs such as UE 112 may include transceiver circuitry 206 coupled to one or more antennas 208 to effectuate wireless communication with the WANN 120 or with another UE such as UE 110. The transceiver circuitry 206 may also be coupled to a processor 210, which may also be coupled to a memory 212 or other storage devices. The memory 212 may be transitory or non-transitory and may store therein computer instructions or code which, when read and executed by the processor 210, cause the processor 210 to implement various ones of the methods described herein.

Similarly, the WANN 120 may include a base station or other wireless network access point capable of communicating wirelessly via the over-the-air interface 204 with one or more UEs and communicating with the core network 130. For example, the WANN 120 may be implemented, without being limited, in the form of a 2G base station, a 3G nodeB, an LTE eNB, a 4G LTE base station, a 5G NR base station, a 5G central-unit base station, or a 5G distributed-unit base station. Each type of these WANNs may be configured to perform a corresponding set of wireless network functions. The WANN 202 may include transceiver circuitry 214 coupled to one or more antennas 216, which may include an antenna tower 218 in various forms, to effectuate wireless communications with the UEs 110 and 112. The transceiver circuitry 214 may be coupled to one or more processors 220, which may further be coupled to a memory 222 or other storage devices. The memory 222 may be transitory or non-transitory and may store therein instructions or code that, when read and executed by the processor 220, cause the processor 220 to implement various functions of the WANN 120 described herein.

Figure 3:
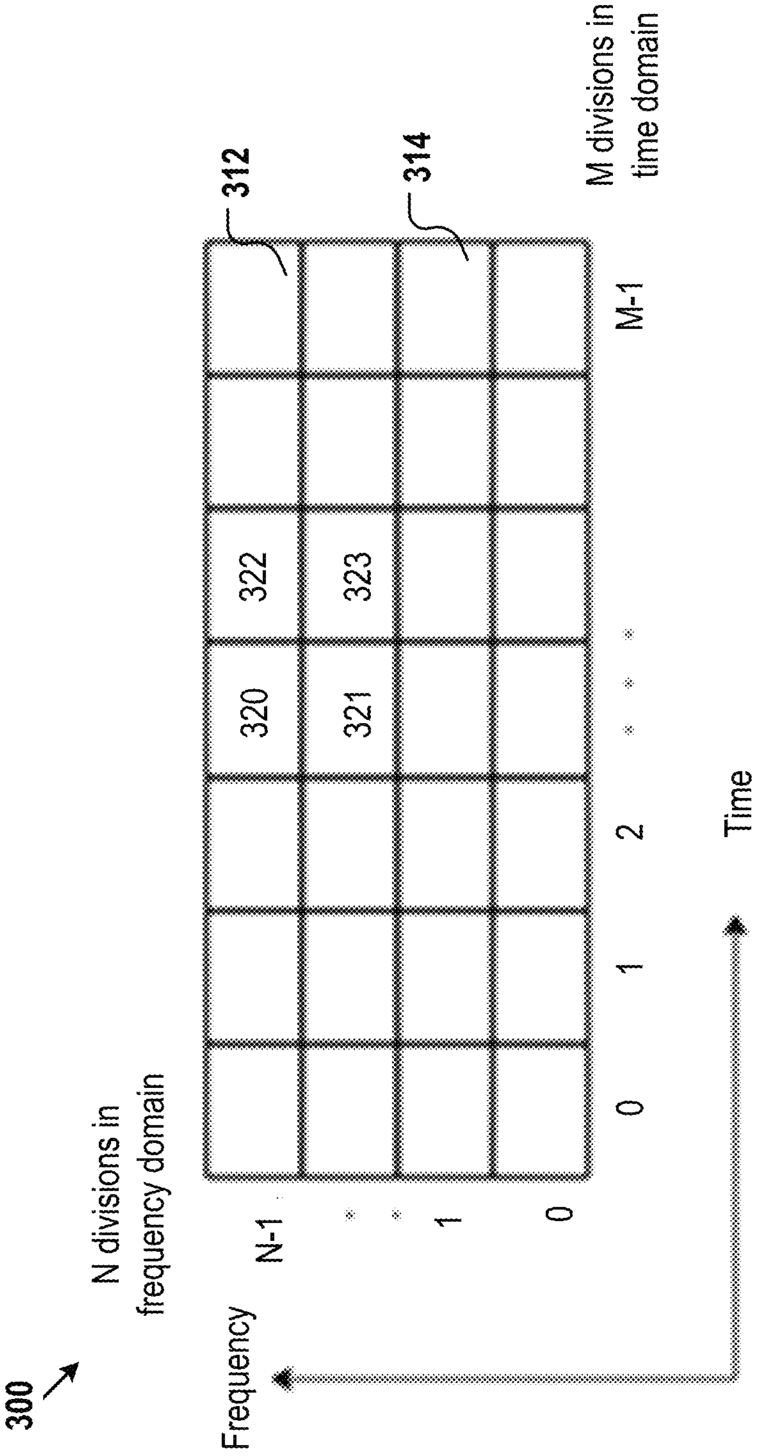
FIG. 3 illustrates an example wireless communication resource grid in both the time domain and frequency domain.

The wireless transmission resources for the over-the-air interface 204 include frequency, time, and spatial resource. For example, the available frequency and time resource available for wireless communication (alternatively referred to as wireless resource, or wireless transmission resource) is illustrated as 300 in FIG. 3. The transmission resource 300 includes time domain resource and frequency domain resource that may be allocated to carry DL or UL data or control information. The transmission resource 300 may be further divided into multiple divisions to support more flexible transmission resource scheduling, configuration, and allocation. For example, in the time domain, the transmission resource 300 may be divided into M divisions, and in the frequency domain, the transmission resource 300 may be divided into N divisions. As such, the transmission resource 300 may be considered as a resource grid including M*N resource divisions. M and N are both positive integers. In FIGS. 3, 312 and 314 are shown as two example division. Organization of the transmission resource 300 into resource divisions of FIG. 3 facilitates more efficient resource allocation, configuration, and utilization.

The division of time and frequency of wireless resource 300 may be made at various hierarchical levels. FIG. 3 merely shows an example division at a particular level. The configuration and identification of the time and frequency resource may be made at any level. For example, the wireless resource 300 may be divided into resource blocks (RBs), representing the smallest unit of wireless resource allocable to a UE to communicate with a WANN. Each RB may be further divided into sub-units in both time and frequency that are separately identifiable and configurable. For example, in the frequency domain, an RB may be divided into a configurable number of subcarriers having a configurable subcarrier spacing. In the time domain, an RB may occupy a time slot with a configurable time length that may be further divided into a number of time units each corresponding to, for example, a symbol in orthogonal frequency division multiplexing (OFDM) or other modulation schemes. Each unit containing a subcarrier in the frequency domain and a symbol in the time domain may be referred to as a resource element (RE), representing the smallest unit of the wireless resource 300 that is identifiable and configurable. The wireless resource 300 may be allocated and configured in higher levels. For example, in the time domain, a sub-frame may include a predetermined number (e.g., 7) of time slots, a frame may include a predetermined number (e.g., 2) of sub-frames. For another example, blocks of subcarriers in a number of RBs in the frequency domain may be organized as various frequency channels, each allocated for different purposes in transmitting data and control information. These frequency channels may include but are not limited to uplink frequency channels (such as physical uplink shared channels (PUSCHs), physical uplink control channels (PUCCHs), and the like) and downlink frequency channels (such as physical downlink shared channels (PDSCHs), physical uplink control channels (PDCCHs), and the like). While the term "frequency channel" is used to refer to the collection of subcarriers in a particular frequency range, the term "channel" by itself may be used to refer to the broader concept of resource units not limited to the frequency domain.

While the description above focuses on time and frequency resource 300, it may be combined with spatial multiplexing based on utilizing multiple antennas and beam forming in wireless transmission. The allocation and configuration of such spatial resources may be part of the overall wireless resource allocation and configuration. The principles underlying the various implementations included in this disclosure are intended to be applicable to wireless resource allocation and configuration including all of time, frequency, and space dimensions.

Phase Tracking Reference Signal (PTRS) Patterns

In a mobile environment, the signal transmission quality and characteristics between a WANN and a UE at the various level of wireless resource units described above may be highly impacted by many factors. Such quality/characteristics may be tracked and measured in order to more efficiently and adaptively allocate/configure these resource units for various communication purposes. Such tracking may be performed a receiving wireless network node by measuring reference signals of various types with known characteristics and transmitted from one wireless network node to another.

Among the various types of reference signals, phase tracking reference signal (PTRS) may be used for tracking phase noises in a channel so that the detected phase noises can be compensated. At different frequency range of the electromagnetic spectrum available for wireless communications, the preferred PTRS configuration may be different in order to provide sufficiently accurate phase noise estimation of various channels within a given frequency range. The design of PTRS, for example, may include a frequency and time pattern of the wireless resource elements in which the PTRS signals are carried.

In some implementations, different types of PTRS resource patterns may be designed and utilized for achieve phase noise reduction under different circumstances (e.g., for different frequency bands). A PTRS pattern may be characterized by various PTRS pattern configuration parameters as described in further detail below.

Figure 4:
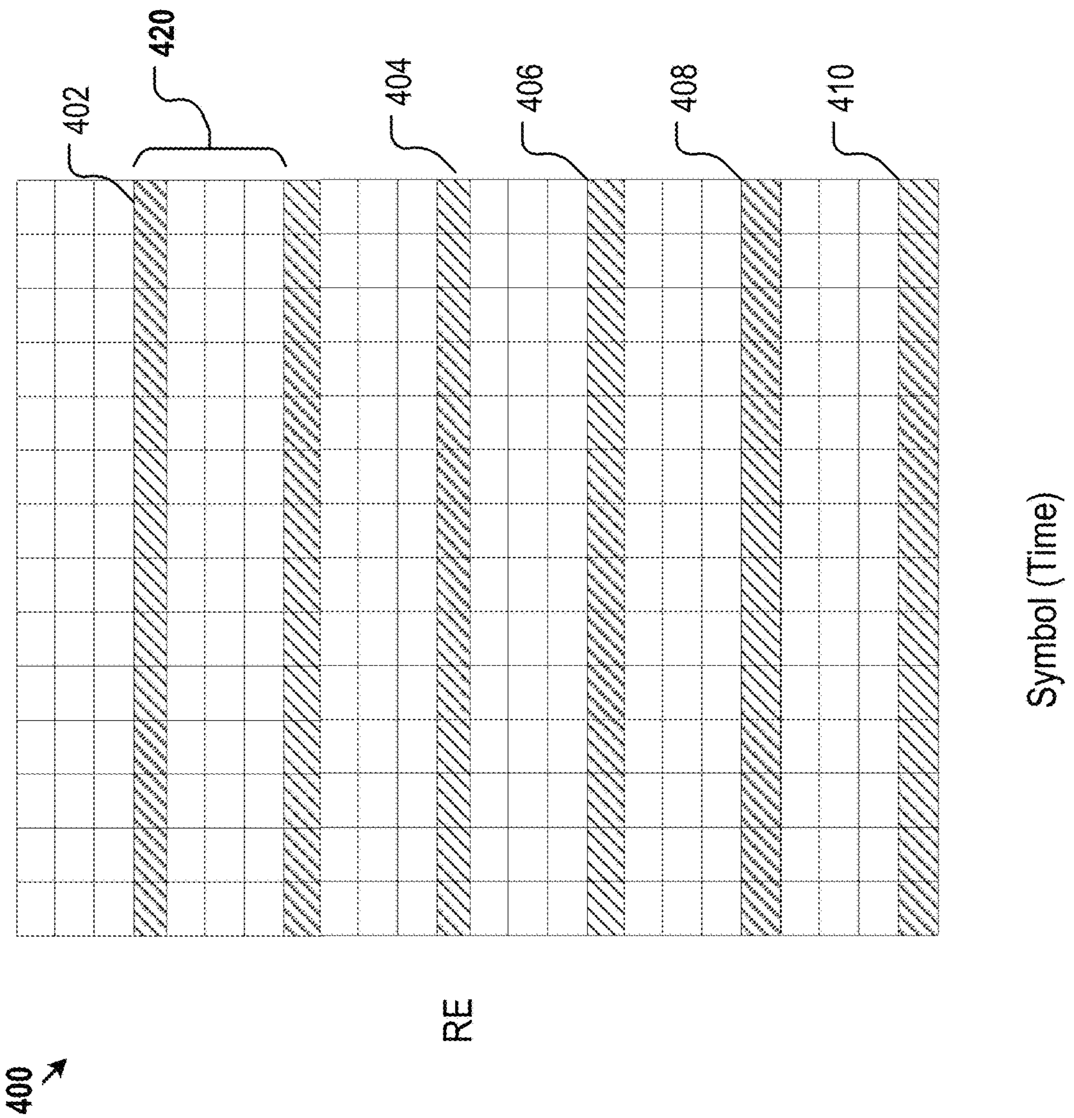
FIG. 4 illustrates an example distributed resource pattern allocated for PTRS in both the time domain and frequency domain.

One example of PTRS patterns is shown as 400 in FIG. 4. In the example PTRS pattern 400, the resource elements carrying phase tracking reference signals may be uniformly and periodically distributed in the whole allocated frequency bandwidth with a RE frequency period illustrated as 420. While in the example of FIG. 4, the RE period 420 for PTRS is illustrated as 4 subcarriers, any other number of subcarriers can be used as the PRTS frequency period. In FIG. 4, the shaded areas such as 402-410 represent the REs that carry the phase tracking reference signals whereas the other open areas represent the REs that carry data and/or other information.

Figure 5:
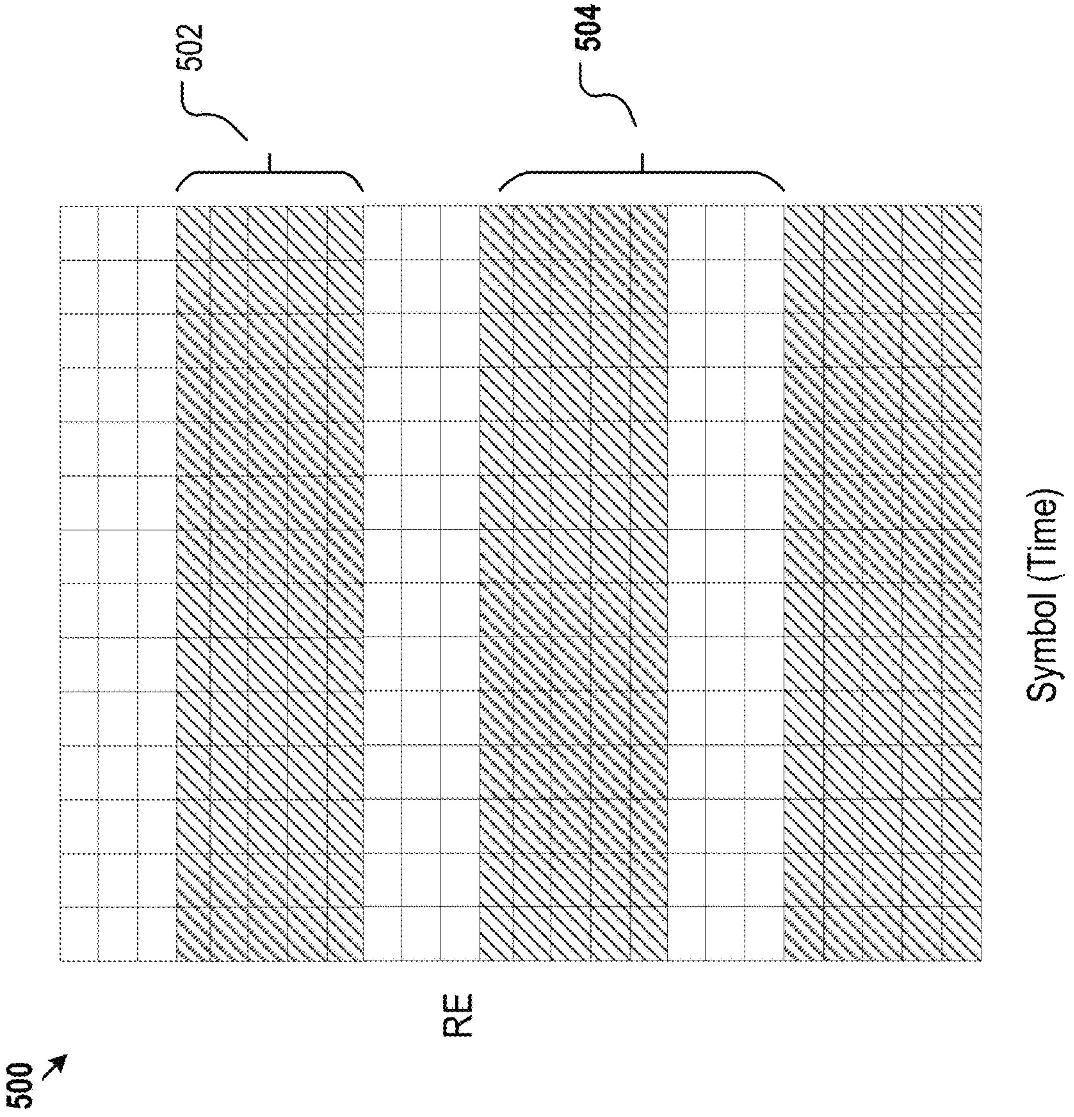
FIG. 5 illustrates an example block resource pattern allocated for PTRS in both the time domain and frequency domain.

Another example of a PTRS pattern is shown as 500 in FIG. 5. In FIG. 5, again, the shaded areas represent the REs that carry the phase tracking reference signals whereas the other open areas represent the REs that carry data and/or other information. In the example PTRS pattern 500, referred to as a block PTRS pattern, the resource elements carrying phase tracking reference signals may also be uniformly and periodically distributed in the whole allocated frequency bandwidth with a RE period illustrated as 504. However, in the block PTRS pattern 500, the PTRS may be distributed as subcarrier blocks each containing a continuous number 502 of subcarriers in the frequency domain. While in the example of FIG. 5, the RE frequency period 504 for PTRS is illustrated as 8 subcarriers in the frequency domain, any other number of subcarriers can be used as the PRTS frequency period. Likewise, while in the example of FIG. 5, the continuous subcarriers of each PTRS block 502 is illustrated as having 5 subcarriers, any other number of subcarriers can be used as a size for each of the PRTS subcarrier block in the frequency domain.

In the example PTRS patterns 400 and 500 above, while the PTRS signals are illustrated as occupying all symbols in the time domain for each of the allocated PTRS subcarriers, the actual implementation need not be so limited. In some implementations, a subgroup rather than the entirety of symbols may be allocated to PTRS. For example, the PTRS RE may be allocated periodically in time domain, e.g., the PTS RE may occupy a configurable percentage of symbols in time domain.

Figure 6:
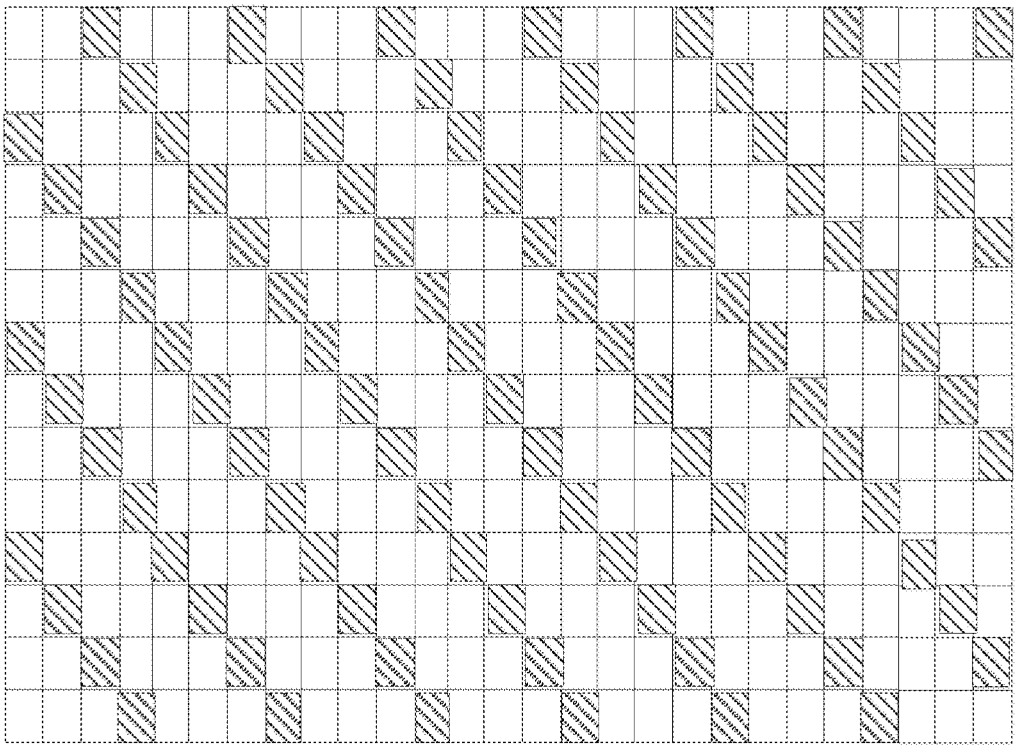
FIG. 6 illustrates an example ladder resource pattern allocated for PTRS in both the time domain and frequency domain.

A third example of a PTRS pattern is shown as 600 in FIG. 6. In FIG. 6, again, the shaded areas represent the REs that carry the phase tracking reference signals whereas the other open areas represent the REs that carry data and/or other information. In the example PTRS pattern 600, the resource elements carrying phase tracking reference signals may be distributed as a ladder in frequency and time domains. For the ladder PTRS pattern 600, a number of PTRS-carrying REs are periodically distributed in the whole allocated bandwidth as ladders. In the example of FIG. 6, the frequency location of PTRS REs from one symbol to a next symbol shifts by one subcarrier. Likewise, the position of the PTRS REs from one subcarrier to the next subcarrier shifts by one symbol. The PTRS REs at each symbol position along the frequency dimension may be characterized by a frequency periodicity. In the Example of FIG. 6, the frequency periodicity is 4 subcarriers. Likewise, PTRS REs at each subcarrier position along the time dimension may be characterized by a time periodicity. In the Example of FIG. 6, the time periodicity is 4 symbols. While the frequency offset from symbol to symbol for PTRS REs is illustrated as one subcarrier, any other subcarrier offset may be used. Likewise, while the symbol offset from subcarrier to subcarrier for the PTRS REs is illustrated as one symbol, any other symbol offset may be used. Further, while the ladder pattern of FIG. 6 is illustrates as going from lower left to the upper right direction (upward ladder), it may also be implemented as going from upper left to the lower right direction (downward ladder).

Figure 7:
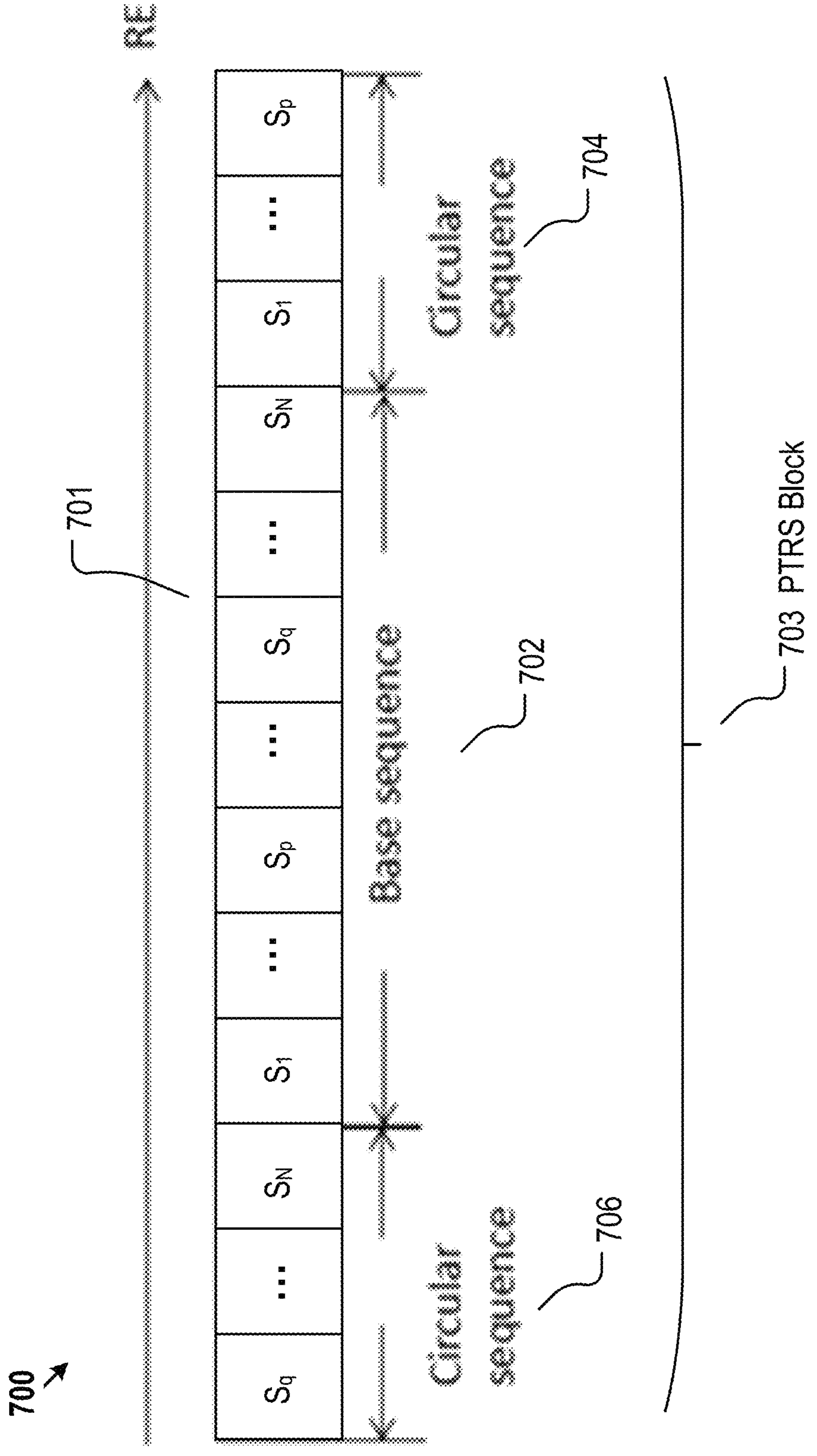
FIG. 7 illustrates an example cyclic sequence implementation for a block resource pattern allocated for PTRS in the frequency domain.

For the block PTRS pattern shown in 500 of FIG. 5, an intra-block reference signal sequence used within each block in the frequency domain may be implemented in various example options. In one of the sequence options, as shown by 700 of in FIG. 7, the subcarriers in each block of PTRS 703 may be configured to carry a cyclic sequence 701. For example, the cyclic sequence 700 may include a base sequence 702 and circular sequences 704 and 706. The base sequence 702 may include a reference signal sequence of $S_1 \ldots, S_p, \ldots S_q, \ldots, S_N$. The circular sequence 704 may be implemented as a head circular portion ($S_1 \ldots, S_p$) of the base circular sequence 702 whereas the circular sequence 706 may be implemented as a tail circular portion ($S_q, \ldots, S_N$) of the base circular sequence 702.

Figure 8:
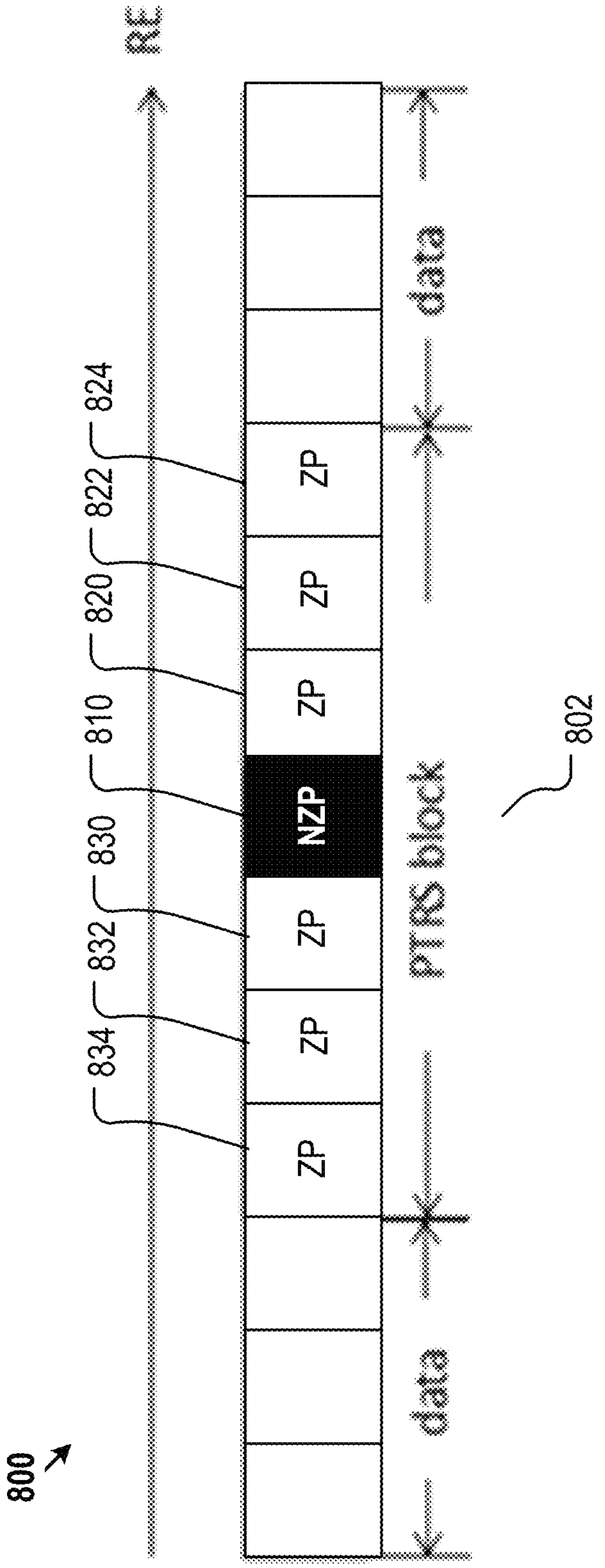
FIG. 8 illustrates an example implementation for a block resource pattern allocated for PTRS in the frequency domain with zero-power resource elements.

In another example intra-block PTRS reference signal configuration, as shown in 800 of FIG. 8, the subcarriers in a PTRS block 802 in frequency domain may be configured to carry the PTRS signal by distributing reference signal power to a subgroup of subcarriers (referred to as non-zero power, or NZP, subcarriers) and leaving the rest of the subcarriers in the block as zero-power subcarriers (referred to as zero power or ZP subcarriers). Distributing reference signal power in such a manner within the PTRS block may help improve reference signal sounding accuracy and efficiency in some circumstances. The NZP subcarriers may be cladded by ZP subcarriers where the ZP subcarriers may function as guard tones. In the particular example of FIG. 8, the PTRS signal is concentrated in a single NZP subcarrier 810 within the PTRS block while all other subcarriers 820, 822, 824, 830, 832, and 834 are ZP subcarriers or guard tones. In some other implementations, more than one central subcarrier of the PTRS subcarrier block may be configured as NZP subcarriers and the remaining subcarriers in the PTRS block may be configured ZP subcarriers.

The three PTRS resource patterns described above are merely examples. Other different PTRS resource patterns may be designed as additional PTRS configuration options. In different electromagnetic spectral ranges and for different mobile application scenarios, one of these patterns may be better suited compared to other patterns.

The current standardized spectrum for cellular wireless communications is generally lower than 52.6 GHz. With the rapid growth of user data, the demand for broader electromagnetic spectrum for cellular wireless communications continues to accelerate. As the wireless spectrum expands into higher frequency bands, including some resource rich licensed and free unlicensed spectrum (such as the frequency spectrum between 52.6 GHz and 71 GHz), phase noise increases, thereby demanding advanced phase noise mitigation methods such as De-ICI techniques at the receiver side as well as higher-order modulation. As the bandwidth is enlarged and the subcarrier spacing is increased (e.g., to 480 kHz and 960 kHz), receiver side ICI mitigation methods may become insufficient due to their complexity and more flexible and versatile PTRS patterns may need to be implemented. For example, the block PTRS may be considered to reduce the phase noise mitigation complexity.

Separate Definition of PTRS Pattern Types

In some implementations, a plurality of types of PTRS patterns may be defined by separate PTRS pattern configuration data structures. Each PTRS pattern type (including but not limited to the distributed PTRS pattern type, the block PTRS pattern type with various reference signal sequence options, and the ladder PTRS pattern type described above in relation to FIGS. 4-8) may be associated with a corresponding set of PTRS pattern configuration parameters. A PTRS pattern configuration data structure for a particular type of PTRS pattern may include data elements or data items representing values of the corresponding set of PTRS pattern configuration parameters. The values in such a data structure may uniquely specify a PTRS pattern of that particular PTRS pattern type and thus identify the locations of REs that carry PTRS signals in an allocated resource grid. In some implementations, PTRS pattern configuration data structures for uplink and downlink PTRS patterns may further be separately defined for each PTRS pattern type.

Merely as an example, an uplink and a downlink PTRS pattern of the distributed PTRS pattern type may be defined by the following PTRS pattern configuration data structures:

```
PTRS-DownlinkConfig ::=                 SEQUENCE {
        frequencyDensity
        timeDensity
        epre-Ratio
        resourceElementOffset
        maxNrofPorts
}
PTRS-UplinkConfig ::=                       SEQUENCE {
        transformPrecoderDisabled                 SEQUENCE {
            frequencyDensity
            timeDensity
            maxNrofPorts
            resourceElementOffset
            ptrs-Power
        }
        transformPrecoderEnabled                 SEQUENCE {
            sampleDensity
            timeDensityTransformPrecoding
        }
}
```

In more detail, the uplink and downlink PTRS configuration data structures above specify 6 example PTRS pattern configuration parameters for a PTRS pattern of the distributed PTRS pattern type. These example pattern configuration parameters include:

- Uplink and downlink PTRS pattern configuration parameter "frequencyDensity," representing PTRS frequency density for, e.g., cyclic prefix orthogonal frequency division multiplexing waveform as a function of scheduled bandwidth. It essentially specifies a density of the PTRS REs in the frequency domain. In some example implementations, the "frequencyDensity" parameter may be specified as an integer that represents a number of REs in each RB that are allocated for PTRS. In some implementations, the frequency density of PTRS REs may be specified indirectly by a scheduled bandwidth via a predefined mapping between scheduled bandwidth ranges and frequency densities for PTRS. This configuration parameter may specify, for example, the PTRS frequency-domain period 420 of FIG. 4 described above.
- Uplink and downlink PTRS pattern configuration parameter "timeDensity," representing PTRS time density for e.g., cyclic prefix orthogonal frequency division multiplexing waveform as a function of MCS. It essentially specifies a density of the PTRS REs in the time domain. In some example implementations, the "timeDensity" parameter may indicate a number of symbols in each time slot that are allocated for PTRS. In some implementations, the time density of PTRS symbols may be specified indirectly by a scheduled modulation coding scheme (MCS) or its index via a predefined mapping between ranges of scheduled MCS or its index and time densities for PTRS. This parameter indicates the time domain PTRS period described above in relation to FIG. 4.

Downlink PTRS pattern configuration parameter "epre-Ratio" for specifying a power ratio between the PTRS signals and data signals.

Uplink and downlink PTRS pattern configuration parameter "resourceElementOffset" for specifying a subcarrier offset of PTRS for, e.g., cyclic prefix orthogonal frequency division multiplexing.

Uplink and downlink PTRS pattern configuration parameter "maxNrofPorts" for specifying a maximum number of PTRS ports for cyclic prefix orthogonal frequency division multiplexing.

Uplink PTRS pattern configuration parameter "ptrs-Power" for specifying power boosting factor per PTRS port.

Uplink PTRS pattern configuration parameter "sampleDensity" for specifying sample density of PTRS for DFT-s-OFDM, pre-DFT (DFT stands for discrete Fourier Transform), and is associated with a set of thresholds indicating dependency between presence of PTRS and scheduled bandwidth and with certain parameters the UE should use depending on the scheduled bandwidth.

Uplink PTRS pattern configuration parameter "timeDensityTransformPrecoding" for specifying a time density (at OFDM symbol level) of PTRS for DFT-s-OFDM waveform.

The values of these parameters would uniquely identify signal power levels and locations of REs in both the frequency and time domains that are configured to carry PTRS signals for the configured PTRS pattern of the distributed PTRS pattern type.

As another example, an uplink and a downlink PTRS pattern of the block PTRS pattern type without cyclic sequence and without ZP tones may be defined by the following PTRS pattern configuration data structures:

```
Block-PTRS-DownlinkConfig ::=                SEQUENCE {
        sizeofBlock
        nrofBlock
        frequencyDensity
        timeDensity
        epre-Ratio
        resourceElementOffset
        maxNrofPorts
}
Block-PTRS-UplinkConfig ::=                  SEQUENCE {
        transformPrecoderDisabled            SEQUENCE {
             sizeofBlock
             nrofBlock
             frequencyDensity
             timeDensity
             maxNrofPorts
             resourceElementOffset
             ptrs-Power
        }
        transformPrecoderEnabled             SEQUENCE {
             sampleDensity
             timeDensityTransformPrecoding
        }
}
```

In more detail, the PTRS configuration data structures above specify 8 example PTRS pattern configuration parameters for a PTRS pattern of the block PTRS pattern type without cyclic sequence and without ZP tones. In comparison to the example PTRS data structures of the distributed PTRS pattern type above, the additional PTRS pattern configuration parameters include:

Uplink and down link PTRS pattern configuration parameter "sizeofBlock" for specifying a number of consecutive PTRS REs in each PTRS block in frequency domain. This parameter, for example, may specify the block size 502 in FIG. 5.

Uplink and down link PTRS pattern configuration parameter "nrofBlock" for specifying a number of PTRS blocks in frequency domain.

In this example of PTRS pattern configuration data structures for PTRS patterns of the block PTRS pattern type, the parameter "frequencyDensity" in the distributed PTRS pattern configuration data structure definition is unnecessary and may thus be removed since the PTRS RE number can be calculated via the "sizeofBlock" and "nrofBlock" parameters. Specifically, the number of PTRS RE can be calculated by multiplying "sizeofBlock" (number of REs in each PRTS block) and "nrofBlock" (number of PTRS blocks). PTRS locations can be further determined in conjunction of the parameter "resourceElementOffset".

The values of these configuration parameters above would uniquely identify signal power levels and locations of REs in both the frequency and time domains that are configured to carry PTRS signals for the configured PTRS pattern of the block PTRS pattern type without cyclic sequence and without ZP tones.

As a further example, an uplink and a downlink PTRS pattern of the block PTRS pattern type with cyclic sequence and without ZP tones may be defined by the following PTRS pattern configuration data structures:

```
CyclicBlock-PTRS-DownlinkConfig ::=            SEQUENCE {
        sizeofBlock
        nrofBlock
        lengthofCircular
        frequencyDensity
        timeDensity
        epre-Ratio
        resourceElementOffset
        maxNrofPorts
}
CyclicBlock-PTRS-UplinkConfig ::=              SEQUENCE {
        transformPrecoderDisabled              SEQUENCE {
             sizeofBlock
             nrofBlock
             lengthofCircular
             frequencyDensity
             timeDensity
             maxNrofPorts
             resourceElementOffset
             ptrs-Power
        }
        transformPrecoderEnabled               SEQUENCE {
             sampleDensity
             timeDensityTransformPrecoding
        }
}
```

In more detail, the PTRS configuration data structures above specify 9 example PTRS pattern configuration parameters for a PTRS pattern of the block PTRS pattern type with cyclic sequence and without ZP tones. In comparison to the example data structures to the block PTRS pattern type without cyclic sequence and without ZP tone above, the additional PTRS pattern configuration parameter includes:

Uplink and down link PTRS pattern configuration parameter "lengthofCircular" for specifying the length of circular sequence in each PTRS block in frequency domain.

The values of these parameters would uniquely identify signal power levels and locations of REs in both the frequency and time domains that are configured to carry PTRS signals for the configured PTRS pattern of the block PTRS pattern type with cyclic sequence and without ZP tones.

As a further example, an uplink and a downlink PTRS pattern of the block PTRS pattern type with ZP tone and without cyclic sequence may be defined by the following PTRS pattern configuration data structures:

```
ZPBlock-PTRS-DownlinkConfig ::=          SEQUENCE {
        sizeofBlock
        nrofBlock
        nrofZPtones
        frequencyDensity
        timeDensity
        epre-Ratio
        resourceElementOffset
        maxNrofPorts
}
ZPBlock-PTRS-UplinkConfig ::=             SEQUENCE {
        transformPrecoderDisabled         SEQUENCE {
             sizeofBlock
             nrofBlock
             nrofZPtones
             frequencyDensity
             timeDensity
             maxNrofPorts
             resourceElementOffset
             ptrs-Power
        }
        transformPrecoderEnabled          SEQUENCE {
             sampleDensity
             timeDensityTransformPrecoding
        }
}
```

In more detail, the PTRS configuration data structures above specify 9 example PTRS pattern configuration parameters for a PTRS pattern of the block PTRS pattern type with ZP tones and without cyclic sequence. In comparison to the example data structures to the block PTRS pattern type without cyclic sequence and without ZP tone above, the additional PTRS pattern configuration parameter include:

Uplink and down link PTRS pattern configuration parameter "nrofZPtones" for specifying a number of ZP tones in each PTRS block in frequency domain.

The values of these parameters would uniquely identify signal power levels and locations of REs in both the frequency and time domains that are configured to carry PTRS signals for the configured PTRS pattern of the block PTRS pattern type with ZP tones and without cyclic sequence.

As a yet another example, an uplink and a downlink PTRS pattern of the ladder PTRS pattern type may be defined by the following PTRS pattern configuration data structures:

```
Ladder-PTRS-DownlinkConfig ::=           SEQUENCE {
        frequencyDensity
        timeDensity
        epre-Ratio
        adjacentSymbolREOffset
        resourceElementOffset
        maxNrofPorts
}
Ladder-PTRS-UplinkConfig ::=              SEQUENCE {
        transformPrecoderDisabled         SEQUENCE {
             frequencyDensity
             timeDensity
             maxNrofPorts
             adjacentSymbolREOffset
             resourceElementOffset
             ptrs-Power
        }
        transformPrecoderEnabled          SEQUENCE {
             sampleDensity
```

-continued

```
             timeDensityTransformPrecoding
        }
}
```

In more detail, the PTRS configuration data structures above specify 7 example PTRS pattern configuration parameters for a PTRS pattern of the ladder PTRS pattern type. In comparison to the example data structures of the distributed PTRS pattern type above, the additional PTRS pattern configuration parameters include:

Uplink and down link PTRS pattern configuration parameter "adjacentSymbolREOffset" for specifying the PTRS RE offset (frequency) between adjacent PTRS symbols.

Further, the uplink and downlink PTRS pattern configuration parameter "resourceElementOffset" used for other patterns may be reinterpreted as the PTRS RE offset of the first PTRS symbol.

The values of these parameters would uniquely identify signal power levels and locations of REs in both the frequency and time domains that are configured to carry PTRS signals for the configured PTRS pattern of the ladder PTRS pattern type.

Messaging and Signaling of Separately Defined PTRS Pattern Configuration

Any of the PTRS pattern configuration data structures above may be implemented as a PTRS configuration message (or PTRS pattern configuration message) communicated from the WANN to the UE. The UE may receive the PTRS configuration message, decode the message, and determine the various PTRS pattern configuration parameters. The values of these PTRS pattern configuration parameters specify power levels for PTRS signals and the location of the REs among the allocated resources that carry the PTRS signals. The UE thus can determine how to receive actual downlink PTRS reference signals and how to transmit actual uplink PTRS reference signals.

A PTRS configuration message, for example, may be implemented as an entirety or a portion/component of a control message, such as a radio resource control (RRC) message. The implementation of a PTRS configuration message, however, is not so limited. The PTRS configuration message may be carried by any of other type of messages that may be communicated from the WANN to the UE.

In some implementations, a single particular PTRS pattern type may be adopted out of the various PTRS pattern types above. Format for a PTRS pattern configuration message for a PTRS pattern of the single PTRS pattern type may be predetermined and stored by the WANN and the UE to follow. The WANN may follow such format to construct a PTRS pattern configuration message and send it to the UE whereas the UE may follow such a format to parse and decode a PTRS pattern configuration message received from the WANN to correctly obtain PTRS pattern configuration parameters.

In some other implementations, a plurality of co-existing PTRS pattern types, such as the ones described above, may be adopted and independently defined. A plurality of corresponding message formats for these PTRS pattern types may be predetermined and stored by the WANN and the UE to follow. Prior to sending actual PTRS reference signals, the WANN may select a downlink PTRS pattern type from the plurality of co-existing PTRS pattern types according to communication circumstances (e.g., frequency range, subcarrier spacing, and the like) and construct a downlink PTRS pattern configuration message following a corresponding message format and send it to the UE for the UE to determine the configured downlink PTRS pattern. Likewise, the WANN may determine a PTRS pattern type for the UE to transmit uplink PTRS signals, and construct an uplink PTRS configuration message following a corresponding message format, and send it to the UE for the UE to determine the configured uplink PTRS pattern.

In order for the UE to correctly decode a received PTRS configuration message when the plurality of PTRS pattern types are adopted and co-existing, the WANN may need to signal the UE as to which type of PTRS pattern configuration is included in a PTRS configuration message. As described below, such signaling may be provided by the WANN explicitly or implicitly.

In some implementations for explicit signaling of a PTRS pattern type when multiple PTRS pattern types co-exist, each PTRS pattern type may be associated with a separate type or format of PTRS configuration message. Message format or type may be included in the header of a PTRS configuration message to indicate the type of PTRS pattern. The UE may determine the PTRS pattern type by parsing the message header, and then use the predefined message format for the particular PTRS pattern to decode the received PTRS configuration message. For example, RRC message types or formats may be defined corresponding to the adopted co-existing PTRS pattern types and their configuration parameter sets.

In some alternative implementations for explicit signaling of a PTRS pattern type when multiple PTRS pattern types co-exist, a single message type may be used in the message header to indicate that a message is for PTRS pattern configuration. An additional signaling information may be provided from the WANN to the UE to specify the PTRS pattern type selected among the plurality of the PTRS pattern types. Such signaling, for example, may be provided via DCI signaling or other signaling paths. The UE may ascertain the PTRS pattern type corresponding to the received PTRS configuration message based on such signaling information and decode the PTRS configuration parameters included in the PTRS configuration message based on the ascertained PTRS pattern type.

In some implementations for implicit signaling of a PTRS pattern type when multiple PTRS pattern types co-exist, no dedicated signaling information may be provided for indicating the PTRS pattern type. Instead, such signaling may be implicitly embedded in other existing system configuration parameters included in other system configuration messages.

For example, the PTRS pattern type may be associated with and indicated by at least one of the following parameters including but not limited to: scheduled RB number, frequency range, scheduled MCS, and subcarrier spacing in various RRC messages. The UE may determine a PTRS pattern type among the plurality of co-existing PTRS pattern types according the value of these other configuration parameters, and then decode a received PTRS configuration message using a known message format corresponding to the determined PTRS pattern type to correctly extract the corresponding PTRS configuration parameters for identifying power level and locations of the uplink or downlink PTRS reference signals.

Non-limiting detailed examples of using a single or a combination of any number of the various other system configuration parameters such as the scheduled RB number (bandwidth), scheduled MCS, subcarrier spacing, and frequency range to implicitly signal and indicate the PTRS pattern type are shown below:

Example 1

| Scheduled RB number (bandwidth) | PTRS pattern Type |
|---|---|
| $N_{RB0} \leq N_{RB} < N$ | PTRS pattern type 1 |
| $N \leq N_{RB}$ | PTRS pattern type 2 |

Example 2

| Scheduled MCS | PTRS pattern Type |
|---|---|
| ptrs-$MCS_1 \leq I_{MCS} < M$ | PTRS pattern type 1 |
| $M \leq I_{MCS}$ | PTRS pattern type 2 |

Example 3

| Scheduled RB number (bandwidth) | Scheduled MCS | PTRS pattern Type |
|---|---|---|
| $N_{RB} < N$ | ptrs-$MCS_1 \leq I_{MCS} < M$ | PTRS pattern type 1 |
| $N_{RB} < N$ | $M \leq I_{MCS}$ | PTRS pattern type 1 |
| $N \leq N_{RB}$ | ptrs-$MCS_1 \leq I_{MCS} < M$ | PTRS pattern type 1 |
| $N \leq N_{RB}$ | $M \leq I_{MCS}$ | PTRS pattern type 2 |

Example 4

| Frequency range | Scheduled RB number (bandwidth) | Scheduled MCS | PTRS pattern Type |
|---|---|---|---|
| FR1, FR2-1, FR2-2 | $N_{RB0} \leq N_{RB} < N$ | ptrs-$MCS_1 \leq I_{MCS} < M$ | PTRS pattern type 1 |
| FR1, FR2-1, FR2-2 | $N_{RB0} \leq N_{RB} < N$ | $M \leq I_{MCS}$ | PTRS pattern type 1 |
| FR1, FR2-1, FR2-2 | $N \leq N_{RB}$ | ptrs-$MCS_1 \leq I_{MCS} < M$ | PTRS pattern type 1 |
| FR1, FR2-1 | $N \leq N_{RB}$ | $M \leq I_{MCS}$ | PTRS pattern type 1 |
| FR2-2 | $N \leq N_{RB}$ | $M \leq I_{MCS}$ | PTRS pattern type 2 |

Example 5

| Subcarrier spacing | Frequency range | Scheduled RB number (bandwidth) | Scheduled MCS | PTRS pattern Type |
|---|---|---|---|---|
| 120 kHz, 480 kHz, 960 kHz | FR1, FR2-1, FR2-2 | $N_{RB0} \leq N_{RB} < N$ | ptrs-$MCS_1 \leq I_{MCS} < M$ | PTRS pattern type 1 |
| 120 kHz, 480 kHz, 960 kHz | FR1, FR2-1, FR2-2 | $N_{RB0} \leq N_{RB} < N$ | $M \leq I_{MCS}$ | PTRS pattern type 1 |
| 120 kHz, 480 kHz, 960 kHz | FR1, FR2-1, FR2-2 | $N \leq N_{RB}$ | ptrs-$MCS_1 \leq I_{MCS} < M$ | PTRS pattern type 1 |

-continued

| Subcarrier spacing | Frequency range | Scheduled RB number (bandwidth) | Scheduled MCS | PTRS pattern Type |
|---|---|---|---|---|
| 960 kHz | FR1, FR2-1, FR2-2 | $N \leqq N_{RB}$ | $M \leqq I_{MCS}$ | PTRS pattern type 1 |
| 120 kHz, 480 kHz | FR2-2 | $N \leqq N_{RB}$ | $M \leqq I_{MCS}$ | PTRS pattern type 2 |

In the examples above, N is an integer, $N>N_{RB0}$, M is integer, and $M>\text{ptrs-MCS}_1$. $N_{RB0}$ and $\text{ptrs-MCS}_1$ may be predefined values.

PTRS pattern type 1, for example, may refer to the distributed PTRS pattern type. PTRS pattern type 2 may refer to one PTRS pattern type of block PTRS without cyclic sequence and ZP tones, block PTRS with cyclic sequence, block PTRS with ZP tones, and ladder PTRS.

While the examples above use various system configuration parameters to implicitly signal one of two PTRS types. In some implementations, these and other system configuration parameters, individually, or in any combination, may be used to implicitly indicate more than two types of PTRS patterns. For example, any ones of the distributed PTRS pattern type, block PTRS pattern type without cyclic sequence, block PTRS pattern type with cyclic sequence, block PTRS pattern type with ZP tones, and ladder PTRS pattern type may form multiple types of PTRS pattern adopted by the system, and signaling or indication of a particular pattern may be provided any individual or combination of the configuration parameters above.

Aggregated Definition of PTRS Pattern Types

In some alternative implementations, when a plurality of types of PTRS patterns co-exist, they may be defined by an aggregated PTRS configuration data structure rather than by separately and independently defined PTRS configuration data structures. An example aggregated uplink PTRS configuration data structure and an example aggregated downlink PTRS configuration data structure are shown below:

```
PTRS-DownlinkConfig ::=            SEQUENCE {
        sizeofBlock
        lengthofCircular
        nrofZPtones
        adjacentSymbolREOffset
        frequencyDensity
        timeDensity
        epre-Ratio
        resourceElementOffset
        maxNrofPorts
}
PTRS-UplinkConfig ::=                SEQUENCE {
        transformPrecoderDisabled        SEQUENCE {
                sizeofBlock
                lengthofCircular
                nrofZPtones
                adjacentSymbolREOffset
                frequencyDensity
                timeDensity
                maxNrofPorts
                resourceElementOffset
                ptrs-Power
        }
        transformPrecoderEnabled           SEQUENCE {
                sampleDensity
                timeDensityTransformPrecoding
        }
}
```

Each of the PTRS configuration data structure above essentially aggregates all PTRS configuration parameters needed for all co-existing PTRS pattern types into one data structure. The example parameters included in the aggregated PTRS data structures above are similar to those described above for the separately defined PTRS data structures, using the distributed PTRS pattern type, block PTRS pattern type (with cyclic circular sequence or ZP tones), and ladder PTRS pattern type as examples.

Messaging and Signaling of Aggregated PTRS Pattern Configuration

The aggregated PTRS pattern configuration data structure above may be implemented as a PTRS pattern configuration message communicated from the WANN to the UE. The UE may receive the PTRS pattern configuration message. The UE may additionally receive signaling information indicating the PTRS pattern type among the plurality of co-existing PTRS pattern types as selected by the WANN. Based on both the received PTRS pattern configuration message and the PTRS pattern signaling information, the UE may decode the PTRS pattern configuration message, and selectively extract the various relevant PTRS pattern configuration parameters from the PTRS pattern configuration message according to the signaled PTRS pattern type. The values of these selectively extracted PTRS pattern configuration parameters specify power levels for PTRS signals and the location of the REs among the allocated resources that carry the PTRS signals. The UE thus can determine how to receive actual downlink PTRS reference signals and how to send actual uplink PTRS reference signals.

The PTRS pattern configuration message, for example, may be implemented as an entirety or a portion/component of a control message, such as a radio resource control (RRC) message. The implementation of a PTRS pattern configuration message, however, is not so limited. The PTRS pattern configuration message may be carried by any of other types of message that may be communicated from the WANN to the UE.

Only a subset of the PTRS pattern configuration parameters among all parameter defined in the above aggregated PTRS pattern configuration message may be applicable to a particular PTRS pattern type among the plurality of co-existing PTRS pattern types. The association between the parameter subsets and the corresponding PTRS pattern types may be stored by the UE and by the WANN. Prior to sending actual PTRS reference signals, the WANN may select a downlink PTRS pattern type from the plurality of co-existing PTRS pattern types according to communication circumstances (e.g., frequency range, subcarrier spacing, and the like) and construct the downlink aggregated PTRS configuration message with the set of PTRS configuration parameters corresponding to the selected PTRS pattern type specified. The WANN may further provide the necessary signaling information to the WANN to indicate the selected PTRS pattern type. The UE may then correctly decode the PTRS pattern configuration parameters by only considering the relevant subset of parameters as activated. Likewise, the WANN may determine a PTRS pattern type for the UE to transmit uplink PTRS signals, and construct an uplink aggregated PTRS configuration message with the relevant PTRS pattern configuration parameters specified, and send it to the UE along with PTRS pattern type signaling information for the UE to decode the received PTRS pattern configuration message to extract the set of activated PTRS pattern configuration parameters for identifying power levels and resource positions of REs for carrying uplink PTRS reference signals.

Some PTRS pattern configuration parameters specified in the aggregated PTRS pattern configuration message may be applicable to all pattern types and are thus always activated. For example, the parameters “timeDensity”, “frequencyDensity”, “epre-Ratio”, and “maxNrofPorts” may be always activated. Some other parameters may only be relevant to particular PTRS pattern types and are thus only active when the corresponding PTRS pattern type is indicated. For example, the “sizeofBlock” parameter is only activated when the block PTRS pattern is indicated; the “sizeofBlock” and “lengthofCircular” parameters are only both activated when the block PTRS pattern with cyclic sequence is indicated; the “sizeofBlock” and the “nrofZP-tones” parameters are only both activated when the block PTRS pattern with ZP tones is indicated; the “adjacentSymbolREOffset” parameter is only activated and the parameter “resourceElementOffset may be interpreted as the PTRS RE offset of the first PTRS symbol when the ladder PTRS pattern is indicated. PTRS pattern configuration parameters in the aggregated PTRS pattern configuration message that are not relevant to the indicated PTRS pattern type may not be activated and are thus ignored.

The signaling information indicates which PTRS pattern type is selected by the WANN such that the UE can ascertain from all the parameters specified in the received PTRS pattern configuration message the activated or relevant PTRS pattern configuration parameters. The signaling of the PTRS pattern type may be performed by the WANN explicitly or implicitly.

For example, in some implementations for explicit signaling of a PTRS pattern type when multiple PTRS pattern types co-exist, signaling for the type of PTRS pattern may be provided via DCI signaling or other signaling paths or interfaces. The UE may ascertain the PTRS pattern type corresponding to the received aggregated PTRS configuration message based on such signaling information and correctly decode the relevant set of PTRS configuration parameters included in the PTRS configuration message. In some other implementations, the PTRS pattern type may be explicitly indicated to UE through other control signaling such as RRC signaling.

In some implementations for implicit signaling of a PTRS pattern type when multiple PTRS pattern types co-exist, no dedicated signaling information may be provided for indicating the PTRS pattern type. Instead, such signaling may be implicitly embedded in other existing system configuration parameters included in other system configuration messages.

For example, the PTRS pattern type may be associated with and indicated by at least one of the following parameters including but not limited to: scheduled RB number, frequency range, scheduled MCS, and subcarrier spacing in various RRC messages. The UE may determine a PTRS pattern type among the plurality of co-existing PTRS pattern types according the value of these other configuration parameters, and then decode a received PTRS configuration message using a known message format corresponding to the determined PTRS pattern to correctly extract the corresponding PTRS configuration parameters for identifying power level and location of the uplink or downlink PTRS reference signals.

Non-limiting detailed examples of using a single or a combination of any number of the various other system configuration parameters such as the scheduled RB number (bandwidth), scheduled MCS, subcarrier spacing, and frequency range to implicitly indicate the PTRS pattern type are similar to those given above for the implementation of implicit signaling for separately defined PTRS pattern configuration data structures and messages, and are duplicated below, assuming that two types of PTRS patterns (type 1 and type 2) are defined and adopted:

Example 1

| Scheduled RB number (bandwidth) | PTRS pattern Type |
|---|---|
| $N_{RB0} \leq N_{RB} < N$ | PTRS pattern type 1 |
| $N \leq N_{RB}$ | PTRS pattern type 2 |

Example 2

| Scheduled MCS | PTRS pattern Type |
|---|---|
| $\text{ptrs-MCS}_1 \leq I_{MCS} < M$ | PTRS pattern type 1 |
| $M \leq I_{MCS}$ | PTRS pattern type 2 |

Example 3

| Scheduled RB number (bandwidth) | Scheduled MCS | PTRS pattern Type |
|---|---|---|
| $N_{RB} < N$ | $\text{ptrs-MCS}_1 \leq I_{MCS} < M$ | PTRS pattern type 1 |
| $N_{RB} < N$ | $M \leq I_{MCS}$ | PTRS pattern type 1 |
| $N \leq N_{RB}$ | $\text{ptrs-MCS}_1 \leq I_{MCS} < M$ | PTRS pattern type 1 |
| $N \leq N_{RB}$ | $M \leq I_{MCS}$ | PTRS pattern type 2 |

Example 4

| Frequency range | Scheduled RB number (bandwidth) | Scheduled MCS | PTRS pattern Type |
|---|---|---|---|
| FR1, FR2-1, FR2-2 | $N_{RB0} \leq N_{RB} < N$ | $\text{ptrs-MCS}_1 \leq I_{MCS} < M$ | PTRS pattern type 1 |
| FR1, FR2-1, FR2-2 | $N_{RB0} \leq N_{RB} < N$ | $M \leq I_{MCS}$ | PTRS pattern type 1 |
| FR1, FR2-1, FR2-2 | $N \leq N_{RB}$ | $\text{ptrs-MCS}_1 \leq I_{MCS} < M$ | PTRS pattern type 1 |
| FR1, FR2-1 | $N \leq N_{RB}$ | $M \leq I_{MCS}$ | PTRS pattern type 1 |
| FR2-2 | $N \leq N_{RB}$ | $M \leq I_{MCS}$ | PTRS pattern type 2 |

Example 5

| Subcarrier spacing | Frequency range | Scheduled RB number (bandwidth) | Scheduled MCS | PTRS pattern Type |
|---|---|---|---|---|
| 120 kHz, 480 kHz, 960 kHz | FR1, FR2-1, FR2-2 | $N_{RB0} \leq N_{RB} < N$ | $\text{ptrs-MCS}_1 \leq I_{MCS} < M$ | PTRS pattern type 1 |
| 120 kHz, 480 kHz, 960 kHz | FR1, FR2-1, FR2-2 | $N_{RB0} \leq N_{RB} < N$ | $M \leq I_{MCS}$ | PTRS pattern type 1 |

-continued

| Subcarrier spacing | Frequency range | Scheduled RB number (bandwidth) | Scheduled MCS | PTRS pattern Type |
|---|---|---|---|---|
| 120 kHz, 480 kHz, 960 kHz | FR1, FR2-1, FR2-2 | $N \leq N_{RB}$ | ptrs-$MCS_1 \leq I_{MCS} < M$ | PTRS pattern type 1 |
| 960 kHz | FR1, FR2-1, FR2-2 | $N \leq N_{RB}$ | $M \leq I_{MCS}$ | PTRS pattern type 1 |
| 120 kHz, 480 kHz | FR2-2 | $N \leq N_{RB}$ | $M \leq I_{MCS}$ | PTRS pattern type 2 |

In the examples above, N is an integer, $N>N_{RB0}$, M is integer, and M>ptrs-$MCS_1$. $N_{RB0}$ and ptrs-$MCS_1$ may be predefined values.

PTRS pattern type 1, for example, may refers to the distributed PTRS pattern type. PTRS pattern type 2 may refer to one PTRS pattern type of block PTRS without cyclic sequence, block PTRS with cyclic sequence, block PTRS with ZP tones, and ladder PTRS.

While the examples above uses various system configuration parameters to implicitly signal one of two PTRS types. In some implementations, these and other system configuration parameters, individually, or in any combination, may be used to implicitly indicated more than two types of PTRS patterns. For example, each of the distributed PTRS pattern type, block PTRS pattern type without cyclic sequence, block PTRS pattern type with cyclic sequence, block PTRS pattern type with ZP tones, and ladder PTRS pattern type may form multiple types of PTRS pattern indicated by the system configuration parameters or other system configuration parameters, either individually or in combination.

In some other implementations, the PTRS pattern type may be implicitly signaled by the values of the various PTRS pattern parameters within the received PTRS pattern configuration data structure and message.

For example, if a valid value of "sizeofBlock" parameter is present in the PTRS pattern configuration message, e.g., larger than 1, whereas no valid "lengthofCircular" parameter (e.g., 0 or smaller) and no valid "nrofZPtones" parameter (e.g., 0 or smaller), that may be used as an indication that the PTRS pattern is of the block PTRS pattern type without cyclic sequence and without ZP zones.

For another example, if a valid value of the "sizeofBlock" parameter is present in the PTRS pattern configuration message, e.g., larger than 1, and a valid value of the "lengthofCircular" parameter is present, e.g., larger than 0, that may be used as an indication that the PTRS pattern is of the block PTRS pattern type with cyclic sequence.

For another example, if a valid value of the "sizeofBlock" parameter is present in the PTRS pattern configuration message, e.g., larger than 1, and a valid value of the "nrofZPtones" parameter is present, e.g., larger than 0, that may be used as an indication that the PTRS pattern is of the block PTRS pattern type with ZP tones.

For another example, if a valid value of "adjacentSymbolREOffset" parameter is present in the PTRS pattern configuration message, e.g., larger than 0, that may be used as an indication that the PTRS pattern is of the ladder PTRS pattern type.

If no valid values are present for the above parameters, it may be used as an indication that the PTRS pattern is of the distributed PTRS pattern type.

In the various implementations above using the PTRS pattern parameter values themselves as implicit PTRS pattern type signaling, valid parameters for "sizeofBlock" and "adjacentSymbolREOffset" may not be simultaneously configured, as the configured PTRS pattern cannot be of both the block type and ladder type (they may be mutually exclusive). Likewise, valid parameters for "lengthofCircular" and "nrofZPtones" may not be configured simultaneously, as the configured PTRS pattern cannot both be of block type with cyclic sequence and block type with ZP tones (they may also be mutually exclusive).

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method performed by a wireless terminal device, comprising:
- receiving a control message, the control message comprising a set of phase tracking reference signal (PTRS) resource configuration parameters;
- obtaining a signaling information, the signaling information indicating a particular PTRS resource pattern type among a plurality of predefined PTRS resource pattern types;
- decoding the control message to extract one or more of the set of PTRS resource configuration parameters based on the particular PTRS resource pattern type; and
- receiving or transmitting PTRS signals over radio resources specified by the one or more of the set of PTRS resource configuration parameters,
- wherein the plurality of predefined PTRS resource pattern types comprise:
  - a ladder PTRS resource pattern type having multiple ladders in frequency and time with at least one of the multiple ladders overlapping another one of the multiple ladders in frequency, and at least one of:
    - a distributed PTRS resource pattern type; or
    - a block PTRS resource pattern type,
- wherein the block PTRS resource pattern type comprises one of:
  - a block PTRS resource pattern type without cyclic sequence and without zero-power tones;
  - a block PTRS resource pattern type with cyclic sequence and without zero-power tones; or
  - a block PTRS resource pattern type without cyclic sequence and with zero-power tones,
- wherein the particular PTRS resource pattern type is the ladder PTRS resource pattern type, and
- wherein the one or more of the set of PTRS resource configuration parameters comprise at least an offset configuration parameter specifying resource element offset between adjacent symbols for the particular PTRS resource pattern type.

2. The method of claim 1, wherein:
- the control message belongs to a set of control messages of distinct format predefined corresponding to the plurality of predefined PTRS resource pattern types; and
- obtaining the signaling information comprises:
- extracting format information of the control message from a header of the control message; or
- receiving a signaling message separately from the control message and extracting the signaling information from the signaling message; or
- extracting values of at least one other independent system configuration parameter, and deriving the signaling information based on the values of the at least one other independent system configuration parameter.

3. The method of claim 2, wherein the control message is a radio resource control (RRC) message and the signaling message is a downlink control information (DCI) message.

4. The method of claim 2, wherein obtaining the signaling information comprises extracting the values of at least one other independent system configuration parameter, and deriving the signaling information based on the values of the at least one other independent system configuration parameter, and the at least one other independent system configuration parameter comprises at least one of:
- a scheduled resource block number;
- a scheduled MCS;
- a scheduled resource block number;
- a frequency range; or
- a subcarrier spacing.

5. The method of claim 1, wherein the set of PTRS resource configuration parameters comprise a collection of configuration parameters for all of the plurality of predefined PTRS resource pattern types.

6. The method of claim 5, wherein the one or more of the set of PTRS resource configuration parameters comprise a subset of the set of PTRS resource configuration parameters that are activated for the particular PTRS resource pattern type.

7. The method of claim 6, wherein the remaining configuration parameters in the set of PTRS resource configuration parameters are ignored.

8. The method of claim 6, wherein obtaining the signaling information comprises:
- receiving a signaling message separately from the control message; and
- extracting the signaling information from the separate signaling message.

9. The method of claim 8, wherein the control message is a radio resource control (RRC) message and the signaling message is a downlink control information (DCI) message.

10. The method of claim 6, wherein obtaining the signaling information comprises:
- extracting values of at least one other independent system configuration parameter; and
- deriving the signaling information based on the values of the at least one other independent system configuration parameter.

11. The method of claim 10, wherein the at least one other independent system configuration parameter comprises at least one of:
- a scheduled resource block number;
- a scheduled MCS;
- a scheduled resource block number;
- a frequency range; or
- a subcarrier spacing.

12. The method of claim 6, wherein obtaining the signal information comprises:
- extracting a value of a signature configuration parameter among the set of PTRS resource configuration parameters;
- determining whether the value of the signature configuration parameter is in a predefined valid range; and
- determining the signal information based on whether the value of the signature configuration parameter is in the predefined valid range.

13. The method of claim 12, wherein:
- the signature configuration parameter comprises one of:
- a block size for blocks of consecutive resource elements in frequency domain for the block PTRS resource pattern type;
- a length configuration parameter specifying a length of a circular reference signal sequence in each block of consecutive resource elements in frequency domain for the block PTRS resource pattern type;

a zero-power tone parameter specifying a number of zero-power tones in each block of consecutive resource elements in frequency domain for the block PTRS resource pattern type; or an offset configuration parameter specifying resource element offset between adjacent symbols for the particular PTRS resource pattern type.

14. A wireless device comprising a processor and a memory, wherein the processor is configured to read computer code from the memory to implement a method in claim 1.

15. A method performed by a wireless access network node, comprising:

selecting a particular PTRS resource pattern type among a plurality of predefined PTRS resource pattern types;

constructing a control message, the control message comprising a set of phase tracking reference signal (PTRS) resource configuration parameters;

determining parameter values for one or more of the set of PTRS resource configuration parameters to specify a PTRS resource pattern having the particular PTRS resource pattern type;

transmitting the control message to a wireless terminal device; and providing a signaling information to the wireless terminal device to indicate the particular PTRS resource pattern type, wherein the plurality of predefined PTRS resource pattern types comprise:

a ladder PTRS resource pattern type having multiple ladders in frequency and time with at least one of the multiple ladders overlapping another one of the multiple ladders in frequency, and at least one of:

a distributed PTRS resource pattern type; or a block PTRS resource pattern type, wherein the block PTRS resource pattern type comprises one of:

a block PTRS resource pattern type without cyclic sequence and without zero-power tones;

a block PTRS resource pattern type with cyclic sequence and without zero-power tones; or a block PTRS resource pattern type without cyclic sequence and with zero-power tones, wherein the particular PTRS resource pattern type is the ladder PTRS resource pattern type, and wherein the one or more of the set of PTRS resource configuration parameters comprise at least an offset configuration parameter specifying resource element offset between adjacent symbols for the particular PTRS resource pattern type.

* * * * *